United States Patent [19]

Desourdy

[11] 4,039,090
[45] Aug. 2, 1977

[54] MUCK-EVACUATING SYSTEM IN TUNNELING OPERATION

[76] Inventor: Bernard Desourdy, 545 deNormandie Street, Longueuil, Quebec, Canada

[21] Appl. No.: 742,256

[22] Filed: Nov. 16, 1976

Related U.S. Application Data

[62] Division of Ser. No. 616,824, Sept. 25, 1975.

[51] Int. Cl.² .......................................... B65G 67/02
[52] U.S. Cl. .................................. 214/40; 198/706; 214/38 CA; 214/311
[58] Field of Search ............ 214/1 MS, 38 R, 38 CA, 214/40, 311; 198/706

[56] References Cited

U.S. PATENT DOCUMENTS

1,103,316  7/1914  Noelle ............................ 214/40 X

FOREIGN PATENT DOCUMENTS

296,658  2/1917  Germany ............................ 214/40

*Primary Examiner*—Robert G. Sheridan

[57] ABSTRACT

A muck-evacuating system such as for use in tunneling operation and including in combination a train of wagons running in a tunnel and an elevator of separate receptacles adapted to automatically pick up the muck-filled receptacles one by one off the train of wagons, to raise them through a shaft to automatically trip them over to discharge the muck therefrom into a chute at ground level, and to return the emptied receptacles on the wagons, which are then moved through the tunnel for refilling at the tunnel face. The system includes a pair of laterally spaced-apart endless conveyor link chains defining an elevating conveyor run and a lowering conveyor run, a train of wagons, separate receptacles removable off the wagons, hooks secured to opposite sides of each receptacle, studs secured to the link chains and inwardly projecting to upwardly engage the hooks of the receptacles and thus elevate the latter, and a tripper member positioned and profiled to serially trip the receptacles to empty the same into the upper end of the shaft and allow return of the empty receptacles back onto the train.

10 Claims, 5 Drawing Figures

MUCK-EVACUATING SYSTEM IN TUNNELING OPERATION

This patent application is a division of Patent application Ser. No. 616,824, filed Sept. 25, 1975 and entitled: RECEPTACLE DISCHARGING ELEVATOR SYSTEM.

This invention relates to a muck-evacuating system in tunneling operation.

In tunneling operation, it is important to minimize as much as possible the losses of time, such that the costly equipment and teams are most efficiently used, that is with a minimum of waiting time, such as by the drilling team while the material removal team does its work.

It is a general object of the present invention to provide an efficient much-evacuating system to remove the loosened earth and rock or much from a tunnel during tunneling operation.

It is another general object of the present invention to provide an elevator system of simple and rugged construction which is particularly adapted to serially elevate receptacles off a train of wagons running in a tunnel, discharge the receptacles at ground level, lower the emptied vehicles and deposit the same onto the wagons which are then moved through the tunnel to the face of the latter for refilling.

The above and other objects and advantages of the present invention will be better understood with the following detailed description of a preferred embodiment thereof which is illustrated, by way of example in the accompanying drawings, in which.

The illustrated muck-evacuating system includes, in combination, a receptacle elevator and a trackless train system.

Figure 1:
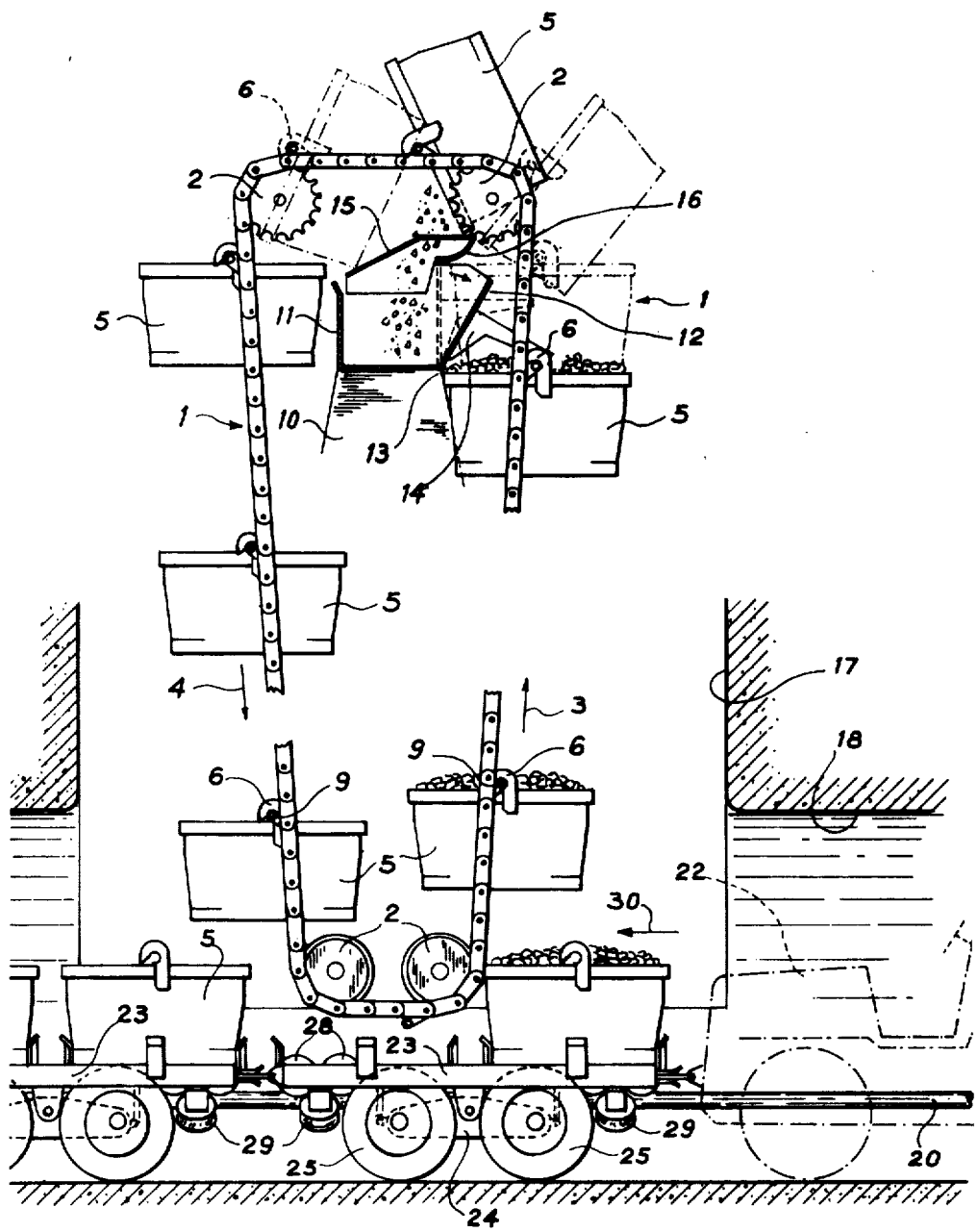
FIG. 1 is a side elevation view of a receptacle discharging system with a trackless train system according to the present invention.
Figure 2:
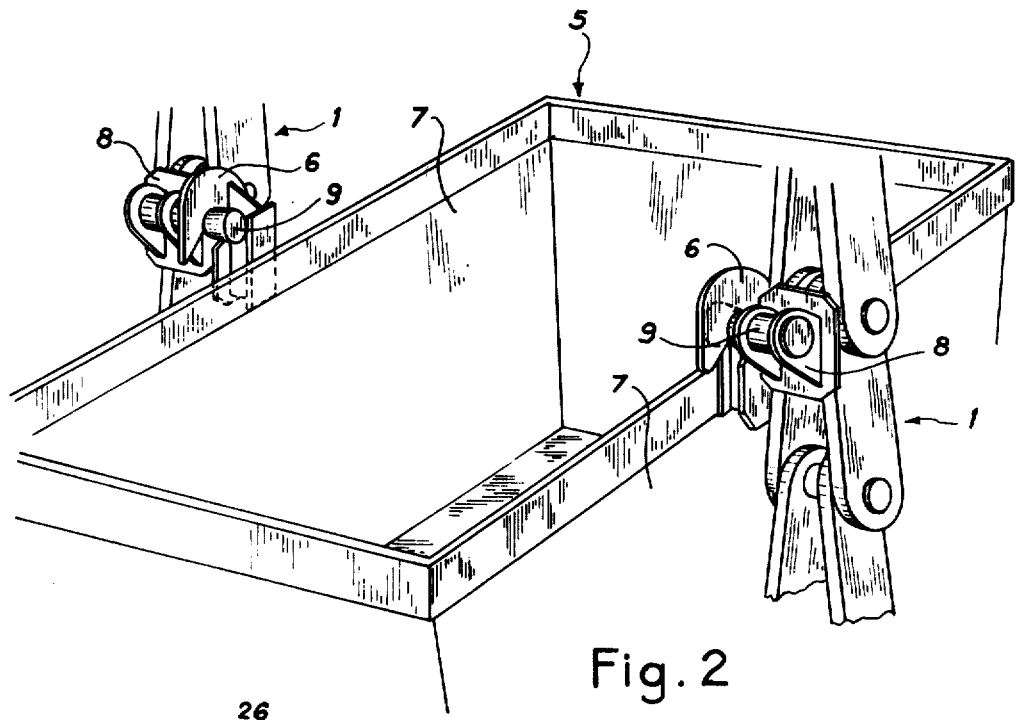
FIG. 2 is a perspective view illustrating the hooking of a receptacle by endless conveyor link chains.

The receptacle elevator includes a pair of laterally spaced-apart endless conveyor link chains 1 formed of chain links of any suitable type, as for instance, those shown in FIG. 2. The link chains 1 are looped around sprockets 2 to define an elevating conveyor run on the side marked by the arrow 3 and a lowering conveyor run on the other side marked by the arrow 4, as shown in FIG. 1.

The elevator system includes a plurality of detached or separate receptacles 5, each having a pair of hooks 6 secured to the opposite lateral sides 7 thereof. Each hook 6 is rigidly secured to the corresponding side 7 and projects upwardly of the receptacle to form a downwardly opening mouth. A plurality of brackets 8 are secured in spaced-apart relationship along each link chain 1. A stud, or pin 9, is mounted on each racket 8 and projects laterally inward relative to the receptacle elevator. Each stud, or pin 9, of one endless link chain 1 is transversely aligned and associated with a corresponding stud, or pin 9, of the other endless conveyor link chain. Each pair of associated studs 9 are laterally spaced apart in predetermined spacing relationship to register with the pair of hooks 6 of any receptacle 5 and thus pivotally engage in the hooks.

A chute 10 is operatively combined with the receptacle elevator to discharge the receptacles 5 therein. The chute 10 includes an upper head end 11 positioned between the upper end of the conveyor runs identified by the arrows 3 and 4. The chute 10 extends downwardly and outwardly from the head end 11. The latter includes a pivoting side wall portion, or panel 12, which is hinged at its bottom edge 13 to the remainder of the head end, such as to outwardly pivot downwardly and thus increase the breath of the opening defined by the head end 11. A control arm 14 is rigidly secured to the outside face of the pivoted side wall portion 12 and extends from the latter to stand in the path of an upcoming receptacle. In particular, the control arm 14 intercepts one stud, or pin 9, of an upcoming receptacle 5 to be displaced by the latter and close the pivoted side wall portion 12, until passage of the corresponding stud 9 off the free end of the arm 14, as may be understood from FIG. 1.

As the control arm 14 moves upward under the action of a pin 9, the side wall portion or panel 12 upwardly pivots, allowing to free the path of displacement of the corresponding receptacle 5. When this stud, or pin 9, passes upwardly at the free end of the arm 14, the top edge of the receptacle reaches the lower and innermost end of the bent wire portion 16.

A receptacle tripper wire 15 is fixed above the head end 11 of the chute 10 and is bent to have a profile which produces tipping over of the oncoming loaded receptacle and pivoting back to normal upright position after discharge of the muck into the chute 10. For this purpose, the profiled strand of wire 15 has a bent portion 16 of studied curvature to produce timely tipping-over of the receptacle. This is achieved by engagement of the top inner edge of the upwardly moving receptacle with the bent portion 16 and sliding of this top inner edge upward and outward along this bent portion. The receptacle thus starts to tilt inward toward the chute 10 while this top inner edge thereof slides upward and outward along the bent portion 16. The panel 12 eventually becomes free and pivots outward to a material collecting open position, as shown in FIG. 1. From the time the top inner edge of the receptacle has freed the panel 12 at the time this edge starts to pivot back against the wire 15 toward level position of the receptacle, all the material has dropped in the chute due to the inclined position of the receptacle.

The afore-described receptacle elevator is used in the shaft 17 of a tunnel 18 which is under construction, such as to evacuate the muck through the chute 10 installed at ground level. In this particular instance, the tunnel 18 is drilled to form a transversely concave bottom 19 which may be substantially uneven at least on part of the length thereof close to the end being drilled.

The present invention also defines a trackless train system particularly adapted to be efficiently used in such tunnel operation to evacuate the muck. This trackless train system includes a duct, or tube 20, which is fixed by appropriate supports 21 to constitute a lateral guide rail laid along the tunnel 18 substantially to one side of the latter. The duct 20 conventionally contains the utility lines, such as for electricity, water, etc., as needed for the tunneling operation.

The trackless train system also includes a train of interconnected cars or wagons displaced by a motor unit 22, as seen in FIG. 1. Each wagon includes a frame, or chassis 23, forming a platform to removably carry a pair of receptacles 5. Each frame, or chassis 23, is rollably carried by a walking beam suspension including a walking beam 24. A pair of load carrying ground wheels 25 are carried by the ends respectively of the walking beam 24 and are longitudinally aligned in a single row along the center line of frame 23 and extending lengthwise centrally of the tunnel 18, such as to roll on the deepest portion of the transversely concave bottom 19.

Figure 3:
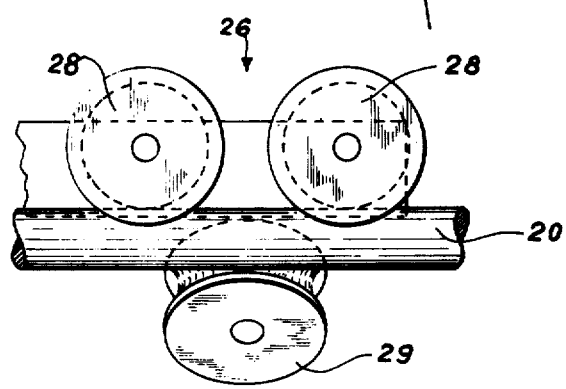
FIG. 3 is a partial elevation view illustrating guide wheels in cooperation with a utility duct or tube forming part of the trackless train system.
Figure 4:
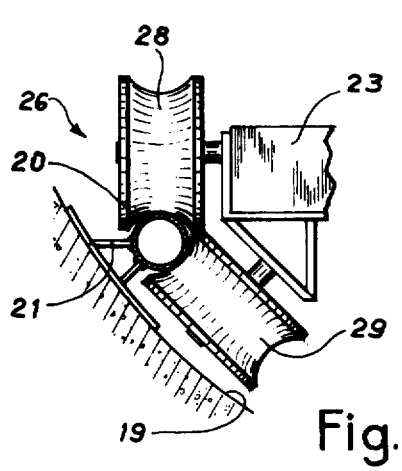
FIG. 4 is a view of the guide wheels of FIG. 3 as seen from the right in the latter.
Figure 5:
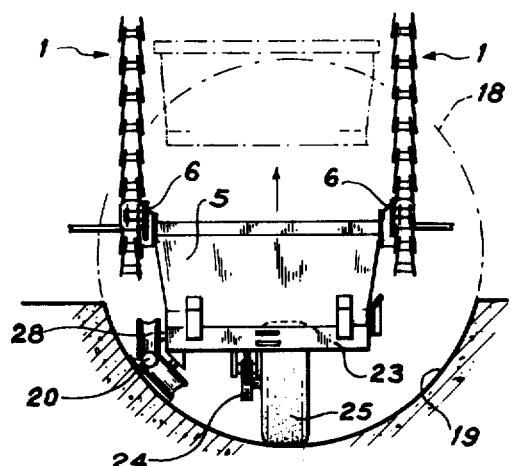
FIG. 5 is an end view of a train and an associated utility duct forming part of the trackless train system.

On the side of each wagon adjacent to the utility duct 20, there is provided a pair of lateral guide assemblies 26, one at each end of frame 23 and one of which is shown in more details in FIGS. 3 and 4. Each lateral guide assembly includes a pair of lateral guide wheels, or rollers 28, rolling on the top of the duct 20 and an intermediate guide wheel, or roller 29, rolling against the bottom of the duct 20, such as to positively laterally guide the corresponding car or wagon and prevent lateral and longitudinal tilting of said car. Guide wheels 28 and 29 have a peripheral groove to receive the pipe or duct 20.

As may be noted from FIG. 1, the link chains 1 extend lower than the hooks 6 of the receptacles 5 on the wagons of the train; the latter is displaced within the space between the two link chains 1 in a direction co-planar with said chains, and the loaded receptacles 5 travel in the direction of the arrow 30 toward the lower end of the elevating conveyor run with the hooks 6 open toward the latter.

Upon appropriate stopping of a loaded receptacle 5, a pair of transversely associated studs, or pins 9, engage the corresponding hooks 6 and life this receptacle off the wagon to be discharged at ground level and lowered back onto a wagon by disengagement of the pins from the hooks.

What I claim is:

1. A muck-evacuating system in tunneling operation for use in a tunnel having a shaft opening at ground level, said system including a train of wagons adapted to travel in the tunnel between the tunnel face and the shaft and a plurality of receptacles removably carried by said wagons and a receptacle elevator located within said shaft and upwardly extending from said tunnel to ground level and adapted to automatically pick up the filled receptacles one by one off the train of wagons, raise said receptacles through said shaft, automatically trip the receptacles over to discharge the muck therefrom at ground level, then lower the empty receptacles and deposit the same back onto the wagons, each of said receptacles having a pair of hook members on opposite sides thereof, said receptacle elevator including a pair of separate and laterally spaced-endless conveyor bands, each conveyor band having two longer runs longitudinally extending upwardly through said shaft and forming an elevating conveyor run and a lowering conveyor run respectively in co-operation with, and separate from, the two longer runs of the other endless conveyor band, hooking members secured to said endless conveyor bands in spaced-apart relationship along the latter and in transverse register with the hooking members of the other conveyor band, and adapted to pivotally engage with hook members on opposite sides of a loaded receptacle on a wagon to raise said loaded receptacle off the wagon, a material collecting chute extending transversely between said conveyor runs at the upper end of said shaft and a receptacle tripper device mounted at the upper end of the elevating conveyor runs adjacent the chute, positioned in the path of the receptacles, to tile the latter one by one over for emptying thereof into the chute, whereby said receptacles are emptied, the lowering conveyor runs lowering the emptied receptacles and depositing the same back onto a wagon.

2. In a muck-evacuating system as claimed in claim 1, wherein said train of receptacles carrying wagons is displaceable endwise under said receptacle elevator through the space between said conveyor bands, the latter extending below the hook members of the receptacles resting on the wagons, so that the hooking members of the endless conveyor bands can move upward to register with and engage with the hook members of a loaded receptacle resting on a wagon for upward lifting of the latter off the wagon and, similarly, the hooking members of the lowering conveyor runs may disengage the hook members of an empty receptacle being lowered upon said receptacle coming to rest on said wagon.

3. In a muck-evacuating system as claimed in claim 2, wherein the hook members on said receptacles each constitute a hook fixedly secured to one side of the receptacle and having a downwardly opening mouth portion, and each of said hooking members on said conveyor bands includes a stud laterally protruding from the conveyor band and engageable with the hook of the receptacle by upward movement of the stud through the downwardly opening mouth portion, said stud disengageable with the hook of the receptacle by downward movement of said stud relative to said receptacle.

4. In a muck-evacuating system as claimed in claim 3, wherein each of said endless conveyor bands constitutes a link chain and each of said hooking members includes a bracket fixedly secured to one chain link and having the corresponding stud laterally projecting therefrom.

5. In a muck-evacuating system as claimed in claim 1, wherein said receptacle tripper device includes a tripper member fixedly secured in the path of displacement of said receptacles and each profiled lengthwise of said endless conveyor bands for guided tipping-over and back upright of each receptacle upon displacement of the latter from the upper end of the elevating conveyor runs to the upper end of the lowering conveyor runs.

6. In a muck-evacuating system as claimed in claim 5, wherein said tripper member constitutes a bent strand of wire allowing discharge of a receptacle therearound.

7. In a muck-evacuating system as claimed in claim 5, wherein said chute includes an upper head portion positioned between the upper ends of the elevating and the lowering conveyor runs of one of said conveyor bands, and said chute extends downwardly from said upper head portion between said upper ends.

8. In a muck-evacuating system as claimed in claim 7, wherein said upper head portion of the chute includes a pivoted side wall portion facing the upper end of the elevating conveyor runs and downwardly pivoting toward the latter and an elongated projection on said side wall portion outwardly projecting endwise from the latter into the path of said hooking members of one of said conveyor bands and bodily pivoting with said side wall portion away and clear of said path upon operative upward displacement by one of said hooking members.

9. In a muck-evacuating system as claimed in claim 1, wherein said tunnel is of substantially circular cross-section and includes a utility pipe secured to the wall of the tunnel and extending substantially parallel to the deepest longitudinal portion of the tunnel laterally of said portion and at a substantially constant level above the same, each wagon of the train including a horizontally disposed frame adapted to receive said receptacles thereon, a pair of load-carrying wheels disposed in a single longitudinal row along the center line of the frame below the same and adapted to run on the deepest longitudinal portion of the tunnel, a walking beam suspension connecting the pair of load-carrying wheels to the wagon frame, brackets extending from both end portions of the wagon frame laterally from one side only of the wagon frame and sets of guide wheels rotatably carried by each bracket, said guide wheels having a peripheral groove for receiving said pipe in rolling engagement therewith, first guide wheels of each set rolling on the top of the pipe and second guide wheels of each set rolling along the bottom of the pipe, said guide wheels laterally guiding the corresponding wagon along the deepest longitudinal portion of the tunnel and preventing lateral and longitudinal tilting of the wagon.

10. In a muck-evacuating system as claimed in claim 9, wherein each wagon frame carries a pair of open top muck-receiving receptacles disposed in a single row longitudinally of the wagon frame.

* * * * *